(12) United States Patent
Kelley, Jr.

(10) Patent No.: US 12,545,179 B2
(45) Date of Patent: Feb. 10, 2026

(54) SYSTEMS, APPARATUSES, AND METHODS FOR ROADSIDE SAFETY EMERGENCIES

(71) Applicant: Thomas G Kelley, Jr., Chico, CA (US)

(72) Inventor: Thomas G Kelley, Jr., Chico, CA (US)

(*) Notice: Subject to any disclaimer, the term of this patent is extended or adjusted under 35 U.S.C. 154(b) by 275 days.

(21) Appl. No.: 18/120,356

(22) Filed: Mar. 10, 2023

(65) Prior Publication Data

US 2023/0286436 A1 Sep. 14, 2023

Related U.S. Application Data

(60) Provisional application No. 63/318,942, filed on Mar. 11, 2022.

(51) Int. Cl.
*B60Q 7/00* (2006.01)
*G08B 5/36* (2006.01)

(52) U.S. Cl.
CPC ............ *B60Q 7/00* (2013.01); *G08B 5/36* (2013.01)

(58) Field of Classification Search
CPC ...... B60Q 7/00; B60Q 1/0088; B60Q 1/2661; B60Q 1/32; B60Q 1/46; B60Q 1/535; B60Q 2300/43; G08B 5/36; B60R 16/03; H02S 30/20; H02S 40/38
See application file for complete search history.

(56) References Cited

U.S. PATENT DOCUMENTS

| | | | |
|---|---|---|---|
| 2008/0036584 A1* | 2/2008 | Lang | F21V 33/00 340/473 |
| 2011/0121654 A1* | 5/2011 | Recker | H05B 45/3725 307/64 |

FOREIGN PATENT DOCUMENTS

| | | | | |
|---|---|---|---|---|
| CN | 107531179 B | * | 7/2020 | ........... B60Q 1/2615 |
| CN | 215164928 U | * | 12/2021 | |

* cited by examiner

*Primary Examiner* — Brian A Zimmerman
*Assistant Examiner* — Anthony D Afrifa-Kyei

(57) ABSTRACT

The present disclosure in one aspect provides technologies for light systems used for roadside emergencies for preventing injuries by providing motor vehicle operators with time to react to emergency situations. In various aspect, technologies provide herein may include structural and electrical components useful in light systems that may serve as visual cues to drivers that a corrective action needs to be taken to avoid further accident and injury. In various aspects, light system technologies are specifically adapted to provide enough warning to oncoming traffic using structural and electrical configurations optimized such that corrective action may be taken in a timely manner.

20 Claims, 13 Drawing Sheets

SYSTEMS, APPARATUSES, AND METHODS FOR ROADSIDE SAFETY EMERGENCIES

CROSS-REFERENCE

The present application claims priority to U.S. Provisional Patent Application No. 63/318,942 filed Mar. 11, 2022, entitled, "SYSTEMS, APPARATUSES, AND METHODS FOR ROADSIDE SAFETY EMERGENCIES", which is entirely incorporated herein by reference for all purposes.

FIELD

The present disclosure generally relates to emergency response equipment and its use. More specifically, the apparatuses, systems, and methods described herein relate to emergency roadside technology that may be deployed by emergency responders and pedestrians to warn oncoming traffic that personnel are responding to an emergency and to increase awareness and reduce speed or stop their vehicle as circumstances require.

BACKGROUND

Roadway travel is an essential form of transportation for business and recreational purposes and necessarily results in unforeseeable emergencies caused by a variety of artificial and natural conditions. Such challenges have existed for as long as roads and vehicles have existed and remain unaddressed or only partially addressed by existing solutions. Some challenges increase and some may be mitigated by changes in technology (e.g., the invention of motorized vehicles).

Non-limiting examples of artificial conditions leading to roadside emergencies can include dead batteries, unexpected tire ruptures, engine trouble, and/or downed power lines. Non-limiting examples of natural conditions leading to roadside emergencies can include flooding, fire, falling roads, downed trees, and/or icy conditions. Emergencies can include collisions between vehicles and/or collisions with objects on the road which can be exacerbated by driver fatigue or distraction.

One of the biggest challenges involving roadway emergencies includes communicating dangers (e.g., roadway obstructions) to moving vehicles, thereby allowing the motorist of the vehicle to react in a timely manner and, thereby, prevent property damage or harm to human life as emergency responders arrive and begin focusing on their activities. Activities can include providing first aid to injured parties and clearing debris from the roadway.

The roadside emergencies described herein can place a variety of different groups in danger. For example, the persons directly involved in emergencies, those stopping to render aid, first responders are all at risk of harm, and those using the roadways in the way location are all at an increased risk for injury or death. Effective communication of emergency roadside conditions and associated locations to the different groups remains a challenge and needs to be addressed.

As such, the systems, apparatuses, and methods described herein address these and other needs relating to roadside emergencies by mitigating risk of harm to the different groups as well as mitigating risk of further property damage by efficiently communicating the presence and location of roadside emergencies. Specifically, the light systems used for roadside emergencies greatly increases the likelihood of preventing additional accidents and injuries at roadside emergencies by providing motor vehicle operators time to react to these unforeseeable situations.

SUMMARY

In various aspects, an emergency roadside warning apparatus is described according to various embodiments. In various embodiments, the emergency roadside warning apparatus may comprise an upper assembly. In various embodiments, the upper assembly may comprise an upper frame, at least one light mounted to the upper frame, a controller mounted to the upper frame. The at least one light may be in electronic communication with the controller. In various embodiments, the upper assembly may comprise an upper handle comprising a grip. In various embodiments, the upper handle may be mounted to the upper frame. In various embodiments, the emergency roadside warning apparatus may comprise a body assembly. In various embodiments, the body assembly may comprise a body frame connected to the upper frame. In various embodiments, the body assembly may comprise a light platform mounted to the body frame. In various embodiments, the body assembly may comprise a body light housing magnetically coupled to the light platform. In various embodiments, the emergency roadside warning apparatus may comprise a lower assembly. In various embodiments, the lower assembly may comprise a lower frame connected to the body frame. In various embodiments, a plurality of legs may be coupled to the lower frame.

CERTAIN DEFINITIONS

Figure 1:
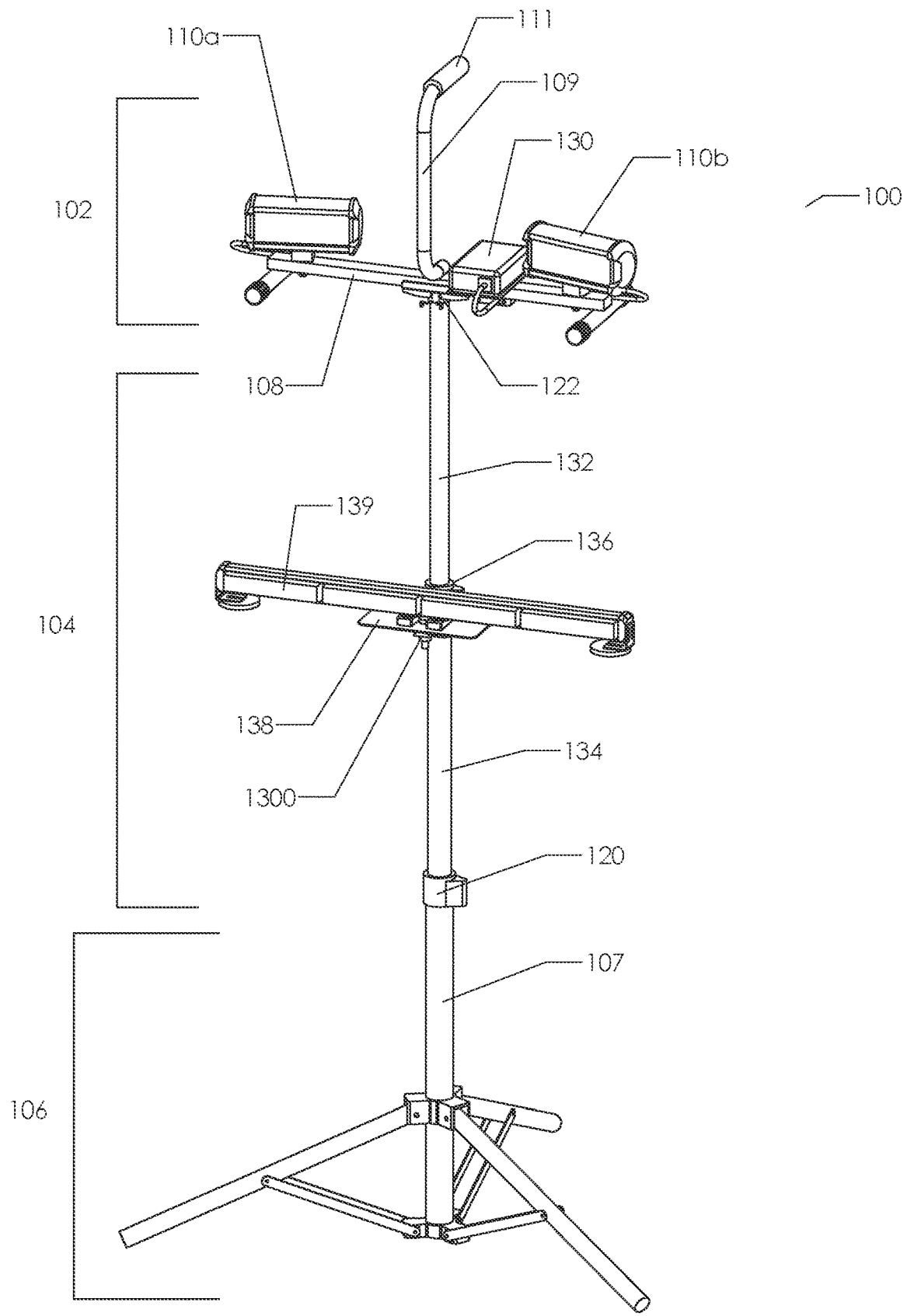
FIG. 1 is a perspective view of an exemplary emergency roadside warning apparatus, in accordance with various embodiments.

As used herein, the term "approximately" or "about," as applied to one or more values of interest, refers to a value that is similar to a stated reference value. In general, those skilled in the art, familiar within the context, will appreciate the relevant degree of variance encompassed by "about" or "approximately" in that context. For example, in some embodiments, the term "approximately" or "about" may encompass a range of values that are within 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less of the referred value.

As used herein, the term "computer-readable medium" (e.g., data store, data storage, etc.) or "computer-readable storage medium," refers to any media that participates in providing instructions to processor for execution. Such a medium can take many forms, including but not limited to, non-volatile media, volatile media, and transmission media. Examples of non-volatile media can include, but are not limited to, optical, solid state, magnetic disks, such as storage device. Examples of volatile media can include, but are not limited to, dynamic memory, such as memory. Examples of transmission media (e.g., an electrical network and a communications network) can include, but are not limited to, coaxial cables, copper wire, and fiber optics, including the wires that comprise bus.

As used herein, the term "coupled," "connected," "joined," may be used interchangeably and include any way of bringing two or more pieces of material into close proximity (e.g., abutting). Connections may be static in nature. Connections may be moveable and/or include or be joints or hinges. Non-limiting examples of connectors that may be used in static connections may include an adhesive, a pin, a screw, a nut, a nail, an elongated piece of material extending through an opening of a first mater and an opening of a second material, etc. Non-limiting examples of connectors that may be used in dynamic connections may include a pin, a screw, a nut, a nail, an elongated piece of material extending through an opening of a first mater and an opening of a second material, etc.

Non-limiting examples of computer-readable media may include, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

DETAILED DESCRIPTION OF CERTAIN EMBODIMENTS

The present disclosure, among other things, provides insights and technologies useful in providing warning to oncoming vehicular traffic of roadside emergencies, obstructions, or other scenarios requiring fast and effective non-verbal communication. In various embodiments, provided technologies are useful and/or effective preventing further traffic accidents by providing visual cues to drivers that they need to decrease speed, stop, and/or make necessary lane changes to avoid making emergency situations worse.

Accidents occurring near and around roadways are quite common. Specifically, highway shoulders are extremely dangerous for both pedestrians, emergency responders, and motorists. According to AAA Foundation for Traffic Safety approximately 12 percent of all interstate highway deaths resulted from shoulder accidents. Stated differently, an estimated 600 people are killed, and thousands are injured every year from emergency stops on highways. Decreased visibility due to the speed of traffic is a major concern and the problem is exasperated by natural and artificial obstacles including blind curves, hill crests, and signage. Existing technologies to increase visibility exist such as flares, triangle reflectors, and rudimentary lighting systems. Flares can sometimes increase the risk of personal injury and are known wildfire hazards while not actually providing much distance visibility. Triangle reflectors are reliant on driver headlights which require the oncoming vehicle be properly oriented and visibility is reliant on the power output of the headlights themselves. Current lighting systems lack proper mounting apparatuses which make them difficult to either store or set up. The disclosure herein provides high power emergency roadside lighting technologies that are easy to store, maintain, and set up with a low chance of failure.

Embodiments of systems, methods of use, methods of manufacture, and apparatuses for emergency roadside light warning are described in the accompanying description and figures. In the figures, numerous specific details are set forth to provide a thorough understanding of certain embodiments. A skilled artisan will be able to appreciate that the packing and transportation system described herein can be used in a variety of ways and circumstances, not limited, to what is specifically detailed. Additionally, the skilled artisan will appreciate that certain embodiments may be practiced without these specific details. Furthermore, one skilled in the art can readily appreciate that the specific sequences in which methods are presented and performed are illustrative and it is contemplated that the sequences can be varied and still remain within the spirit and scope of certain embodiments.

While the present teachings are described in conjunction with various embodiments, it is not intended that the present teachings be limited to such embodiments. On the contrary, the present teachings encompass various alternatives, modifications, and equivalents, as will be appreciated by those skilled in the art.

I. Emergency Roadside Warning Apparatuses

FIG. 1 is a perspective view of an exemplary emergency roadside warning apparatus 100, in accordance with various embodiments. In various embodiments, the emergency roadside earning apparatus 100 may comprise an upper assembly 102, a body assembly 104, and a lower assembly 106. In various embodiments, the upper assembly 102, the body assembly 104, and the lower assembly 106 may be tubular in nature. For example, one or more portions of one or more of the assemblies 102, 104, 106 may comprise supporting materials (e.g., tubing, scaffolding, or other weight bearing supporting elements). In various embodiments, the one or more assemblies 102, 104, 106, or portions thereof, may detachably couple to one another to form a larger frame or scaffold capable of supporting one or more electrical and/or lighting systems described herein.

In various embodiments, the lower assembly 106 and the body assembly 104 may be a single component. In alternative embodiments, the lower assembly 106 and the body assembly 104 may be detectably coupled to one another using a lower connector 120. Non-limiting examples of lower connectors 120 may include one or more welds, clamps, nuts and bolts, pins, screws, and/or adhesive. A skilled artisan will appreciate the vast ways to join two pieces of material whether similar or dissimilar in composition.

In many embodiments, a lower frame 107 of a bottom assembly 106 may provide structural support between an upper assembly 102 and the lower assembly 106. In various embodiments, the lower frame 107 of the bottom assembly 106 may be designed to interact with a portion of the body assembly. In various embodiments, the lower frame 107 may include a sidewall 122 surrounding a center (e.g., a solid piece of material or a cavity). In various embodiments, the sidewall may comprise an inner surface and outer surface.

In various embodiments, a body assembly 104 may comprise a first portion 132 connected to a second portion 134 by a body connector 136. The upper assembly 102 may connect to the body assembly 104 by an upper connector 122. The upper connector 122 may be coupled with the first portion 132 of the body assembly 104.

In various embodiments, the body assembly 104 may comprise a light platform 138. In various embodiments, the light platform 138 may be affixed to the first portion 132 of the upper assembly 102. In alternative and additional embodiments, the light platform 138 may be affixed to the second portion 134 of the body assembly 104. A body light housing 139 may removably attach to the light platform 138. A body light housing 139 may house one or more lights and/or one or more control systems. In various embodiments, a light platform 138 may be secured to the body assembly 104 using an attachment assembly 1300.

In various embodiments, an upper assembly 102 may comprise an upper frame 108. The upper frame 108 may be comprised of a rigid material such as metal, plastic, or any material capable for carrying a load. An upper assembly 102 may comprise one or more upper lights 110a, 110b affixed thereto. An upper assembly 102 may comprise a controller 130 affixed thereto. In various embodiments, the controller 130 serve to control the settings of the one or more upper lights 110a, 110b. In various embodiments, the controller 130 serve to provide electrical power to the one or more upper lights 110a, 110b. In various embodiments, the controller 130 may be electrically coupled to the one or more lights through a wire. In various embodiments, the controller 130 may be electrically coupled to the one or more lights through a wireless connection.

In various embodiments, the frame may be connected to an upper handle 109. The connection may be made with a weld, screw and bolt, pin, adhesive, etc. The upper handle 109 may include a grip 111 for ease of operation and/or transport by a user. The grip 111 may be comprised of rubber, plastic, cloth, or any material capable of providing an easy hand-hold for a human hand that adheres to the upper handle 109.

Figure 2:
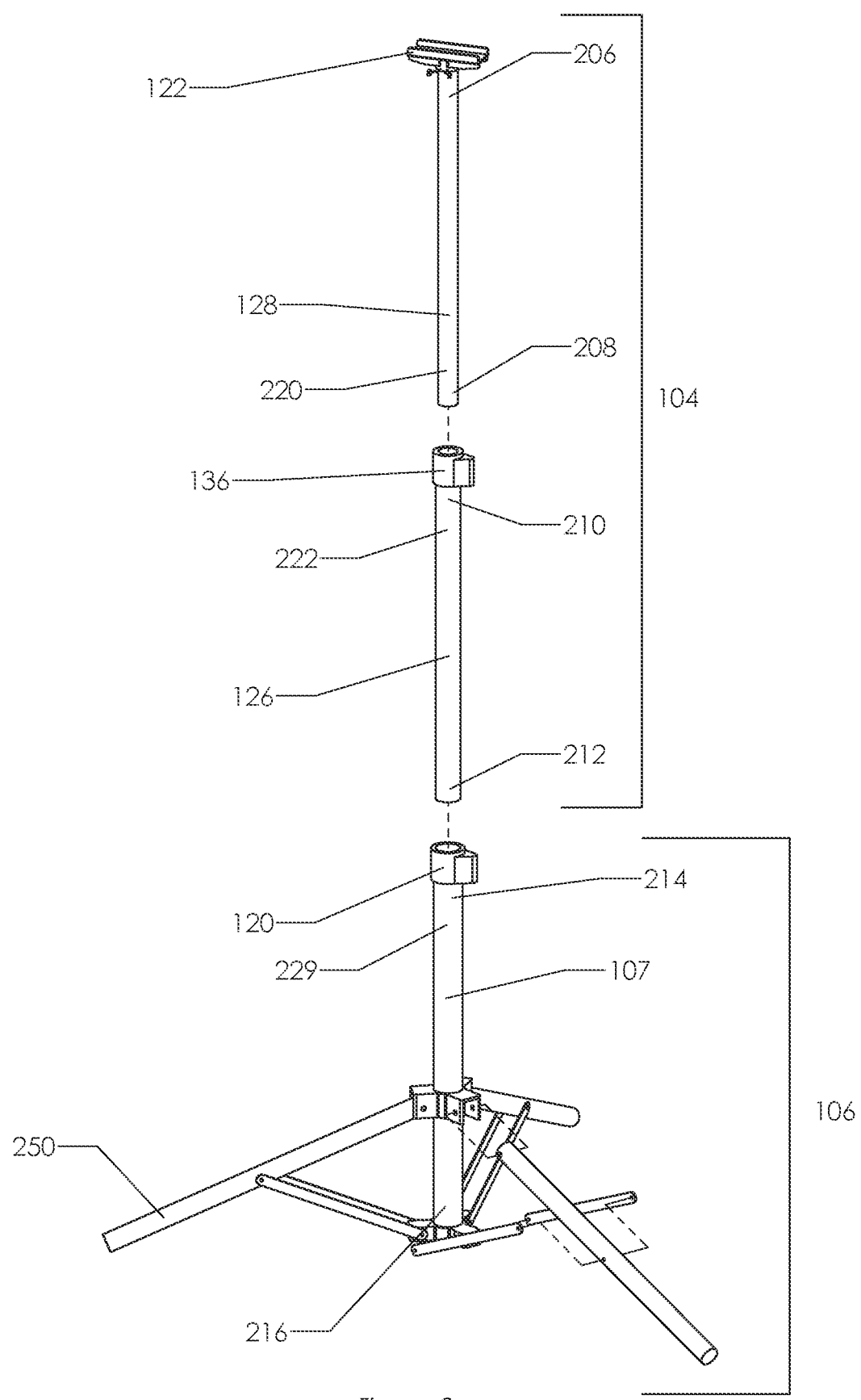
FIG. 2 is a perspective view of an exemplary body assembly and lower assembly of an emergency roadside warning apparatus in a detached state, in accordance with various embodiments.

FIG. 2 is a perspective view of an exemplary body assembly 104 and lower assembly 106 of emergency roadside warning apparatus in an uncoupled state (e.g., a first portion 126 of a body assembly 104 is uncoupled from a second portion 128 of the body assembly 104; the first portion 126 may be uncoupled from the frame of the lower assembly 120; and so on), in accordance with various embodiments. Various scenarios necessitate compact emergency roadside warning apparatuses. Non-limiting examples include storage for fitting the emergency roadside warning apparatus into compact spaces and/or using individual components of the emergency roadside warning apparatus independently. For example the upper assembly may be disconnected and used independently from the body assembly and/or lower assembly.

In various roadside apparatuses, one or more kinds of connectors may be used to couple the detachably coupled components of the emergency roadside warning apparatus.

For example, a connector may include a restrictive coupling. In various embodiments, restrictive couples may encircle a tubular frame-like component (e.g., any one of the assemblies and/or frames described herein that are be coupled with or detachably coupled with any other one of the assemblies and/or frames described herein and/or the same) and use an applied force (e.g., one comprising friction) to restrict movement of any one of the assembly components or described herein relative to any one of another or the like assembly components described herein.

In various embodiments, an upper assembly connector 122 may be connected, detectably connected to, may encircle, or may interact with in any way that forms a connection to a first end 206 of a second portion 128 of a body assembly 104. The upper connector 122 may be actuated to disconnect an upper assembly from the rest of an emergency roadside warning system so that the upper assembly may be used independently from a body assembly 104 and/or lower assembly 106. In various embodiments, each assembly (e.g., an upper assembly, a body assembly, a lower assembly, etc.) may include one or more control systems and/or one or more light systems. The control systems may control various aspects of the light systems as described herein.

In various embodiments, at least a portion of a sidewall 220 at or near a second end 208 of a second portion 128 of a body assembly 104 may have a slightly smaller or a slightly larger cross-sectional area and/or a perimeter than a sidewall 222 at or near the first end 210 of the first portion 126 of the body assembly 104. In various embodiments, a body connector 136 may restrict a relative movement of the second portion 128 and the first portion 126 of the body assembly 104 relative to one another. In various embodiments, the body connector 136 may include or be a clamp that compresses the sidewall 220 at or near the second end 208 of the second portion 128 of the body assembly 104 to the sidewall 222 at or near the first end 210 of the first portion 126 of the body assembly 104 by applying a frictional force.

In various embodiments, at least a portion of a sidewall 222 at or near a second end 212 of a first portion 126 of a body assembly 104 may have a slightly smaller or a slightly larger cross-sectional area and/or a perimeter than a sidewall 224 at or near a first end 214 of a lower frame 107 of a lower assembly 106. In various embodiments, a lower connector 120 may restrict a relative movement of the first portion 126 and the lower assembly 106 of the body assembly 104 relative to one another. In various embodiments, a lower connector 120 may include or be a clamp that compresses the sidewall 222 at or near the second end 212 of the first portion 126 of the body assembly 104 to the sidewall 224 at or near the first end 214 of the lower frame 107 of the lower assembly 106 by applying a frictional force.

In various embodiments, a lower frame 107 may comprise a first end 214 and a second end 216. In various embodiments, one or more legs 250 may be coupled to the second end 216 of the lower frame 107.

Clamps and similar devices may be used in conjunction with the frames described herein for telescoping tubular systems as the various frames. In various systems the height of the emergency roadside warning system may be adjusted when one sidewall sides relative to another sidewall described herein.

Various clamps are commercially available where a compressive force may be applied to the material encircling any of the side walls described herein and are available in industries, including automotive, furniture, and any industry using mechanical systems. Some tube clamps used herein may release quick release tube clamps seen in the bicycle industry.

Non-limiting examples include male/female connections, a pipe with a smaller diameter fitting into a pipe with a larger diameter, etc.

Figure 3:
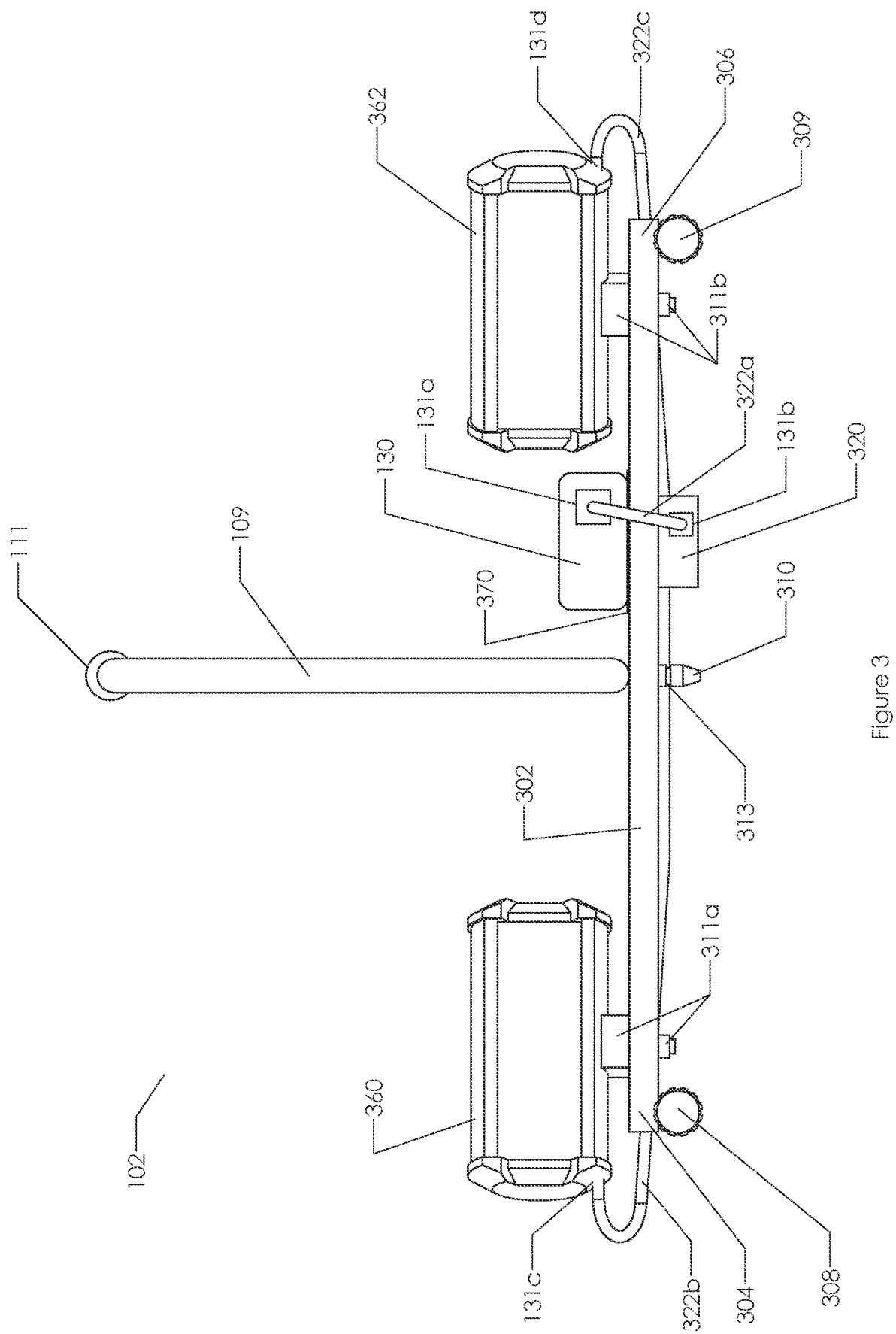
FIG. 3 is a front view of an exemplary upper assembly of an emergency roadside warning apparatus, in accordance with various embodiments.

FIG. 3 is a front view of an exemplary upper assembly 102 of an emergency roadside warning apparatus, in accordance with various embodiments.

An upper assembly 102 may comprise an upper frame 302, according to various embodiments. In various embodiments, the upper frame 302 may be or include a rigid structure designed to support a variety of components. Non-limiting examples of components include light systems, control systems, one or more lights, one or more housings for housing one of other or like components described herein.

In various embodiments, an upper frame 302 may have a first end 304 and a second and 306.

In various embodiments, an upper handle 109 may be mounted to the upper frame 302. In various embodiments, the upper handled 109 may be mounted between the first end 304 and the second end 306 of the upper frame 302 of the upper assembly 102 of the emergency roadside warning apparatus.

In various embodiments, the upper handle 109 may comprise a grip 111. In embodiments where the upper handle 109 comprises a material suitable for coating, the grip 111 may comprise a material wrapped around a portion of the upper handle 109. Non-limiting examples of the material include a natural polymer, a synthetic polymer, rubber, wood, fabric, etc. The upper handle 109 may be connected, joined, coupled, adhered to the upper frame 302 by a connecting element. Non-limiting examples of connecting elements include a weld, a bolt, an adhesive, pin, rod, screw, tack, etc. In various embodiments, a portion of the upper handle 109 may extend through an opening of the upper frame 302.

In various embodiments, a connector end 310 can be coupled with an upper connector of a body assembly. In various embodiments, the upper connector may be mounted to a first end of a second portion of a body assembly. In various embodiments, the portion of the upper handle 109 extending through the upper frame 302 may comprise a connector end 310. In other embodiments, the connector end 310 may be a separate component from the upper handle 109. For example, the connector end 310 may include a grove 313. In various embodiments, the groove 313 may interact with a lip of an upper connector to secure the upper assembly 102 to a body assembly. In various embodiments, the connector end 310 may be moved relative to the upper connector until a portion of the lip abuts a portion or the groove 313, thereby, restricting a position of the upper assembly 102 relative to a position of the body assembly.

In various embodiments, at least one light may be mounted to an upper frame 302. In various embodiments, a first upper light housing 360 may be mounted to the upper frame 302. In various embodiments, the first upper light housing 360 may be mounted at or near a first end 304 of the upper frame 302. In various embodiments, a light connector 311a may secure and/or affix the first upper light housing 360 to the upper frame 302.

In various embodiments, at least one light may be mounted to an upper frame 302. In various embodiments, a second upper light housing 362 may be mounted to the upper frame 302. In various embodiments, the second upper light housing 362 may be mounted at or near a second end 306 of the upper frame 302. In various embodiments, a light connector 311b may secure and/or affix the second housing 362 to the upper frame 302.

In various embodiments, upper assembly 102 may comprise one or more light connectors 311a, 311b. Non-limiting examples of light connectors 311a, 311b may include a screw and nut, a pin, a weld, a magnet, and adhesive, a nail, etc.

In various embodiments, at least one controller 130 may be mounted to an upper frame 302. In some embodiments, a controller 130 or a controller housing may be mounted to a platform 370. The platform 370 may be mounted to the upper frame 302. Mounting may be accomplished through a connection device. Non-limiting examples of connection device may include a weld, an adhesive, a nut and screw, a tack, a pin, etc.

The controller 130 may comprise one or more of the computer systems described herein. In various embodiments, the controller comprises a data store including instructions for carrying out any of the methods described herein. In various embodiments, a housing may enclose or partially enclose the controller 130.

In various embodiments, a controller 130 may comprise a power source for providing electricity to the one or more upper lights. In various embodiments, a network 322 comprises electrical cables for delivering the electricity to the one or more upper lights.

In various embodiments, first upper light housing 360 may comprise a controller, at least one light, and a network adapter 131c in electronic communication with a network 322b. In various embodiments, the network 322b comprises a metal wire for delivery electronic communications and/or electricity. In various embodiments, the network 322b comprises a wireless network.

In various embodiments, second upper light housing 362 may comprise a controller, at least one light, and a network adapter 131d in electronic communication with a network 322c. In various embodiments, the network 322c comprises a metal wire for delivery electronic communications and/or electricity. In various embodiments, the network 322c comprises a wireless network.

In various embodiments, a junction 320 may comprise a housing surrounding an electronic relay system (e.g., wires branching to relay a signal from one component [a control signal or electricity from the controller] to one or more other components [an upper light housing 360, 362]). In various embodiments, the junction 320 and/or the housing may be connected or affixed to the upper frame 302 in any way described herein or elsewhere. In various embodiments, the junction 320 may comprise a network adapter 131b for connecting to a network 322b. In various embodiments, the network 322a may be part of the broader network system (e.g., combined networks 322a, 322b, 322c).

In various embodiments, a junction 320 includes a network router. In various embodiments, a junction 320 comprises a wire harness for delivering electricity to the one or more lights over a network 322 (e.g., through one or more electrical cables connecting to a switch or router).

In various embodiments, an upper assembly 102 may comprise one or more supports 308, 309. In various embodiments, a first support 308 may be mounted at or near the first end 304 of the upper frame 302. In various embodiments, a second support 309 may be mounted at or near the second end 306 of the upper frame 302. In various embodiments the supports 308, 309 comprise legs. In other embodiments, the supports 308, 309 may comprise a stand. In various embodiments, the supports 308, 309 may be designed to support the upper frame 302. For example, the supports 308, 309 may interface with the earth or a vehicle to position the upper assembly 102 of the emergency roadside warning apparatus in a location observable by an intended audience (e.g., oncoming traffic from a distance).

In various embodiments, the one or more of the adapters may be wireless adapters. In various embodiments, the one or more of the adapters may be wired adapters. In various embodiments, the network comprises cable.

In various embodiments, the emergency roadside warning apparatus comprises a control device in electronic communication with a controller. Non-limiting examples of control devices include cellular phones, tablets, desktop computers, laptop computers, or anything including a computer or one or more of the components thereof as described in FIG. 12. In various embodiments, computer-readable instructions for executing any of the methods described herein may be stored on the control device or on a data store accessible over a network and/or bus.

Figure 4:
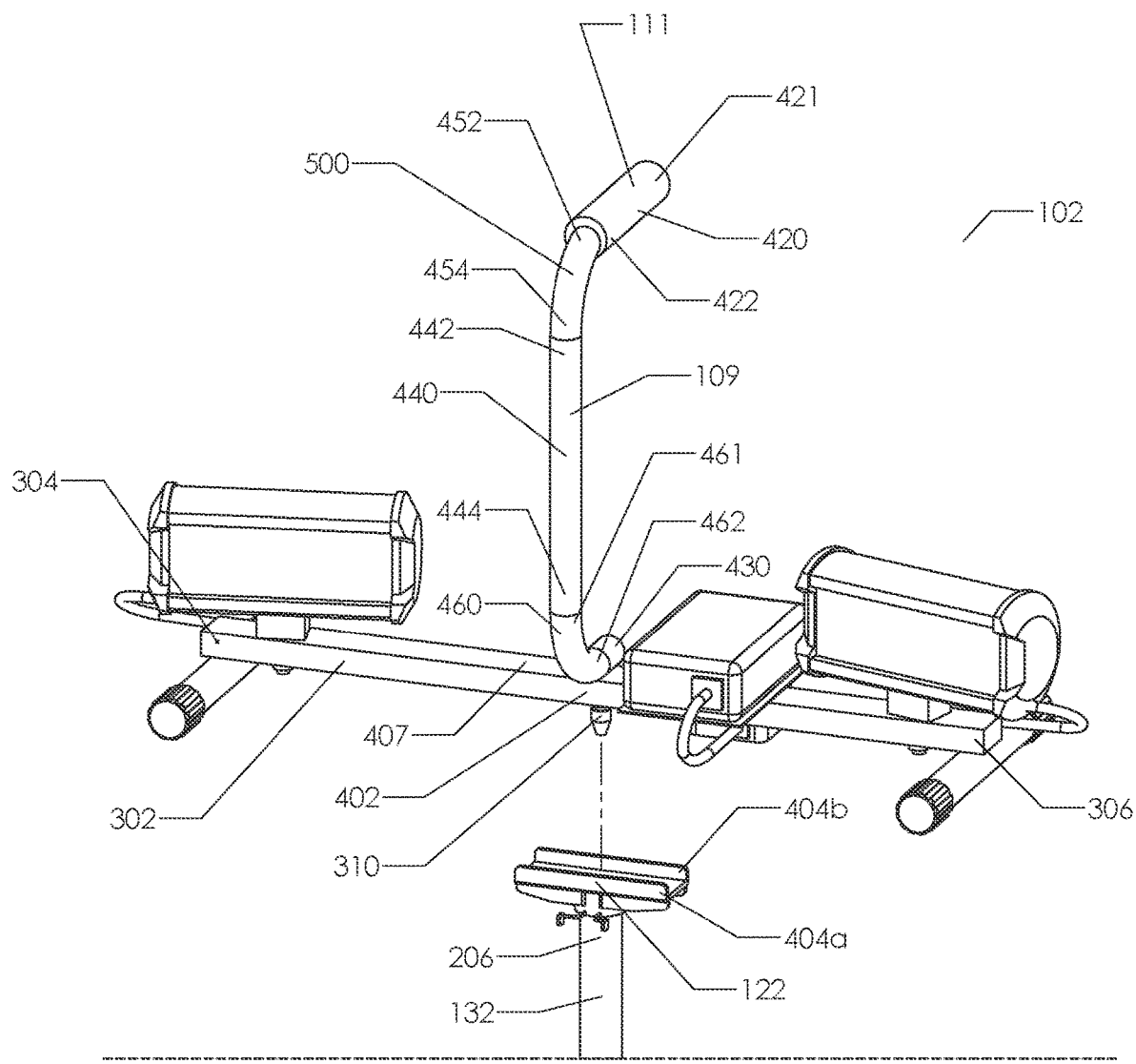
FIG. 4 is an exemplary illustration of an upper assembly and a portion of a body assembly, in accordance with various embodiments.

FIG. 4 is an exemplary illustration of an upper assembly 102 mounted to a portion of a body assembly, in accordance with various embodiments.

FIG. 4 depicts an example of how an upper assembly 102 may transported by a user with ease, in accordance with various embodiments. The emergency roadside warning apparatus may include an ergonomic upper handle 109. The ergonomic upper handle 109 may be designed with a grip 111 for heavy loads. In some embodiments, the ergonomic upper handle 109 may have the appearance resembling the letter "U." Such a configuration allows for a strong attachment to an upper frame 302 through a bottom straight, second portion 430 of the "U" and an easy grip on a top straight, first portion 420 of the "U." The curved, connection portion 440 of the "U" joins the first portion 420 and the second portion 430, in accordance with various embodiments.

An exemplary ergonomic upper handle 109 may comprise a connector portion 440 including a first end 442 and a second end 444. In various embodiments, the first end 442 of the connection portion 440 may be joined to a second end 545 of a first 90-degree coupler 450. In various embodiments, the second end 444 of the connector portion 440 may be joined to a first end 461 of a second 90-degree coupler 460.

An exemplary ergonomic upper handle 109 may comprise a first 90-degree coupler 450 including a first end 452 and a second end 454. In various embodiments, the second end 454 of the first 90-degree coupler 450 is joined to the first end 442 of the connection portion 440.

An exemplary ergonomic upper handle 109 may comprise a second 90-degree coupler 460 including a first end 461 and a second end 462. In various embodiments, the first end 461 of the second 90-degree coupler 460 may be joined to the second end 444 of the connector portion 440.

In various embodiments, a first portion 420 of the upper handle 109 may include a first end 421 and a second end 422. In various embodiments, the second end 422 of the first portion 420 may be joined to the first end 452 of the first 90-degree coupler 450. In various embodiments, the grip 111 encloses at least or portion of the first portion 420.

In various embodiments a second portion 430 may include a first surface and a second surface. The first surface of the second portion 430 may be joined to the second end 462 of the 90-degree coupler 460 and the second surface of the second portion 430 abuts a top surface 407 of the upper frame 302, in accordance with various embodiments.

The upper frame 302 may include an elongated body comprising a cross-section extending from a first end 304 to a second end 306. In various embodiments, the cross-section can be triangular. In various embodiments, the cross-section can be square. Non-limiting examples of cross-section shape may include a triangle, a square, a parallelogram, a rhombus, a pentagon, a hexagon, a heptagon, an octagon, a nonagon, a decagon, a circle, etc.

In various embodiments, the upper frame 102 further comprises one or more flat surfaces 402 based on the cross-section. In various embodiments, the cross-section of the upper frame 102 may provide for a first flat region and an opposing second flat region.

In various embodiments, the upper connector 122 of the first portion 132 of the body frame of the body assembly comprises a first rail 404a and a second rail 404b. In various embodiments, the rails 404a, 404b may be parallel in relation to one another. In embodiments when the upper assembly 102 is connected to the body assembly the connector end 310 may extend through an opening of the upper connector 122. In embodiments when the upper assembly 102 is connected to the body assembly 104 a first rail 404a of the upper connector 122 may abut a flat surface 402 of the upper frame 302. In embodiments when the upper assembly 102 is connected to the body assembly a second rail 404b of the upper connector 122 may abut a flat surface of the upper frame 302.

Figure 5:
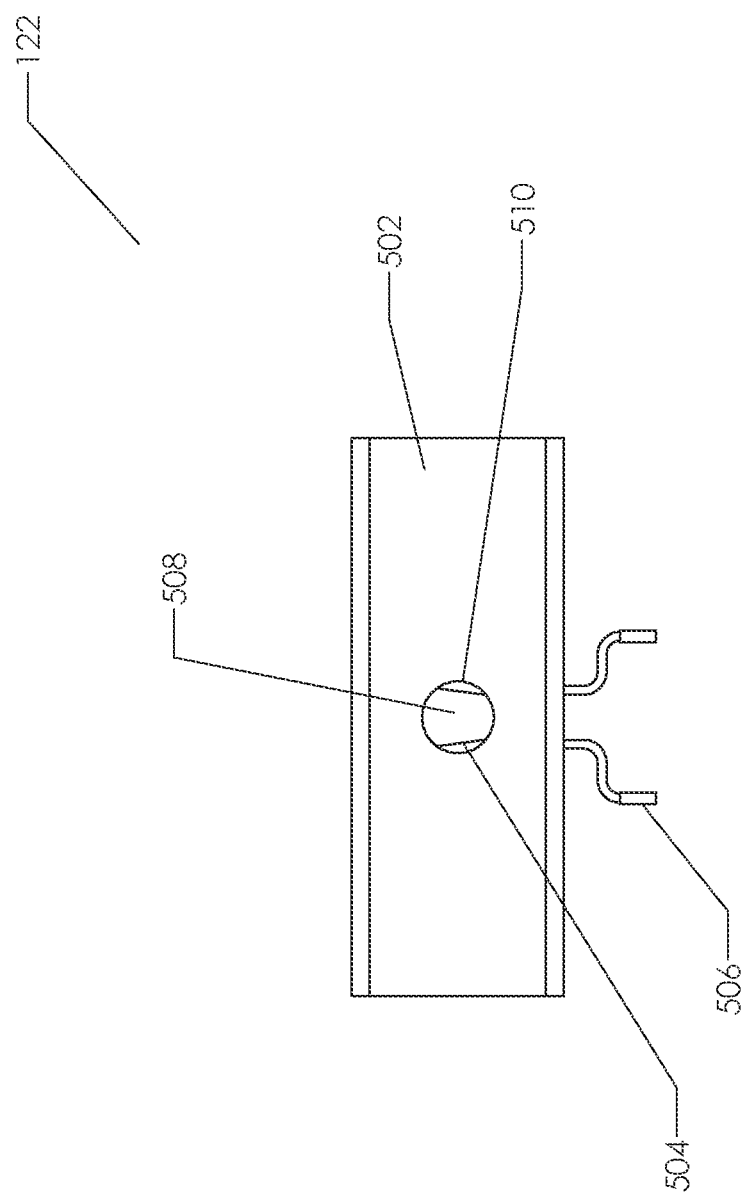
FIG. 5 is a top-down view of an exemplary upper connector of a body assembly of an emergency roadside warning apparatus, in accordance with various embodiments.

FIG. 5 is a top-down view of an exemplary upper connector 122 of a body assembly of an emergency roadside warning apparatus, in accordance with various embodiments.

In various embodiments, an upper connector 122 may include a connector surface 502. In various embodiments, the connector surface 502 abuts the bottom surface of an upper frame of an upper assembly.

In various embodiments, a connector end of an upper frame may extend through an opening 508 of the connector surface 502. In various embodiments, the opening 508 include a perimeter 510 selected to receive the connector end.

In various embodiments, the upper connector 122 may comprise a securing device. In various embodiments, the securing device 122 may comprise one or more clasps for inserting into a groove of the connector end. In various embodiments, the securing device 122 may comprise a securing device actuator 506. An exemplary securing device actuator 506 comprise a first handle and a second handle to be pinched by a thumb and forefinger. Applying pressure to the handles may position the securing device 506 in an open position for receiving the connector end. Releasing the handles may position the securing device 506 in a closed position for interacting with the grooves of the connector end.

Figure 6:
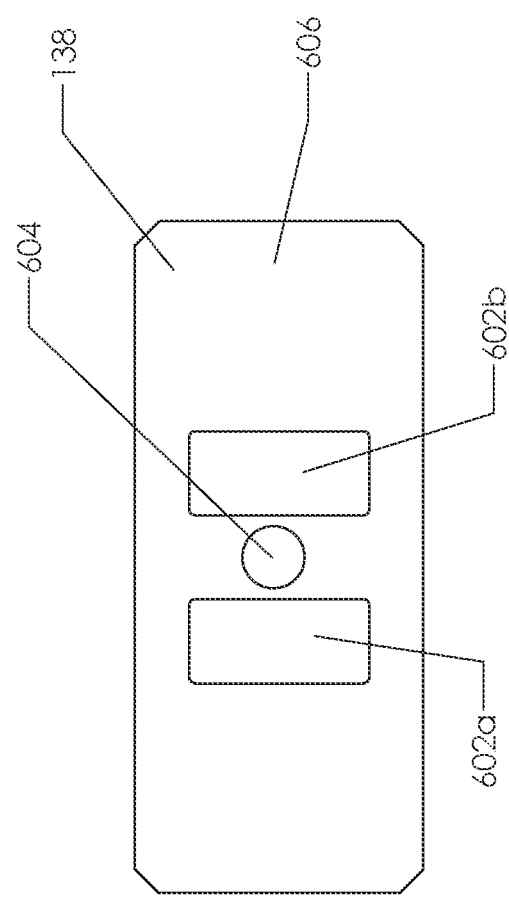
FIG. 6 is an illustration of an exemplary light platform for a body assembly of an emergency roadside warning apparatus, in accordance with various embodiments.

FIG. 6 is an illustration of an exemplary light platform 138 for a body assembly for an emergency roadside warning apparatus, in accordance with various embodiments. In various embodiments, a light platform 138 may include or be a flat surface mounted to a body assembly by one or more platform connectors 604. Non-limiting examples of platform connectors 138 include bolts insert into threads, pins, welds, adhesive compounds, screws, etc. In various embodiments, a magnetic assembly 602a, 602b may be mounted to the surface of the light platform 138.

In various embodiments, the magnetic assembly 602a, 602b generates a magnetic field designed to interact with one or more metal or magnetic portions of a body light housing, thereby, securing the body light housing to the magnetic assembly 602a, 602b of the light platform 138. In various embodiments, the magnetic assembly 602a, 602b may comprise one or more magnetics or electromagnets mounted to the light platform 138. Mounting may be through any understood means, including, but not limited to bolting, bracketing, adhering, etc. by way of weld, adhesive, screw, nut, nail, pin, bracket, etc.

A light platform 138 may be positioned on the first portion of the body assembly. A light platform 138 may be positioned on the second portion of a body assembly. The light plat form 138 may be removed from the body assembly and operate independently.

Figure 7:
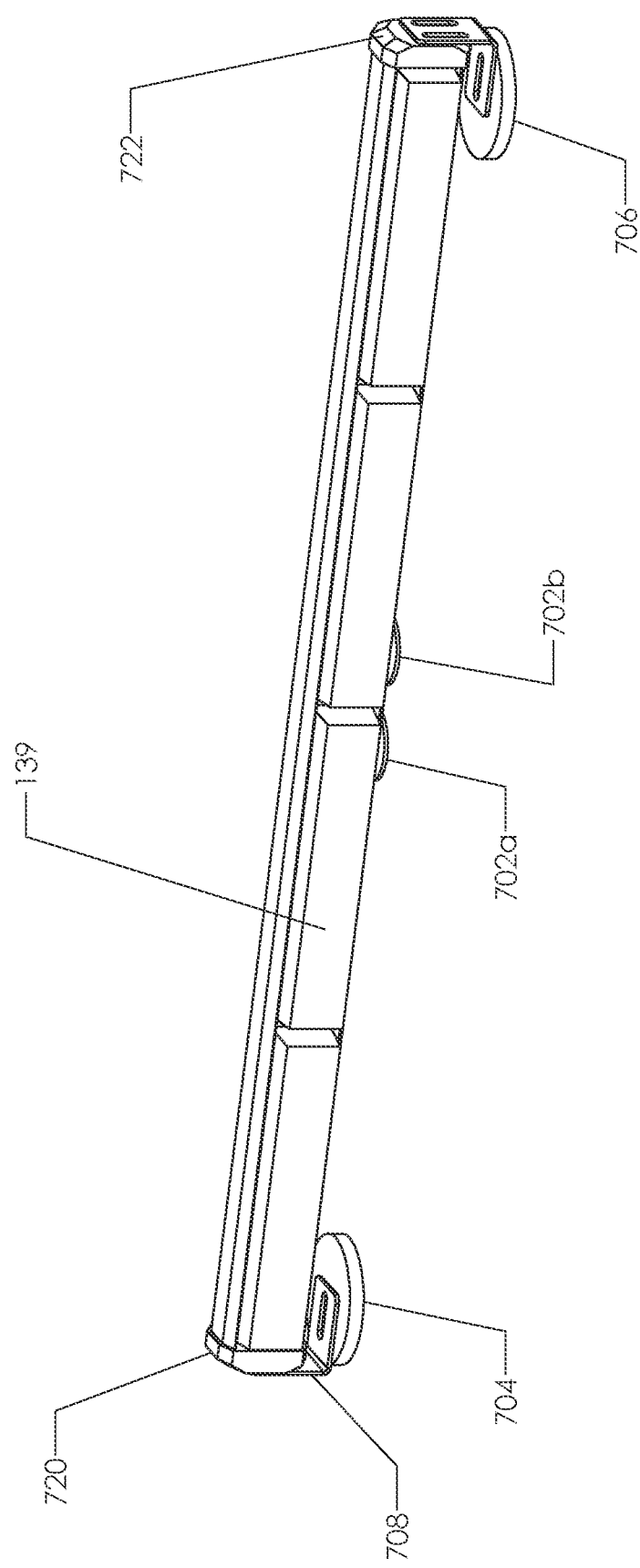
FIG. 7 is an illustration of an exemplary body light housing of an emergency roadside warning apparatus, in accordance with the various embodiments.

FIG. 7 is an illustration of an exemplary body light housing, in accordance with the various embodiments.

The body light housing 139 of an emergency roadside warning apparatus may comprise a first pad 708 connected to first end 720 of the body light housing 139 by a first pad connector 708. The body light housing 139 of an emergency roadside warning apparatus may comprise a second pad 706 connected to second end 722 of the body light housing 139 by a second pad connector 706.

Pads 706, 708 may provide a surface for the body light housing 139 to rest when uncoupled from a body assembly. Pads 706, 708 may be made partially or entirely from metal. Pads 706, 708 may be made partially or entirely of a magnetic material. Pads 706, 708 may be made partially or entirely of an electromagnetic material. Pads 706, 708 may allow the body light housing 139 to be magnetically secured to metal surfaces. An example of a metal surface may include a surface of a vehicle. Non-limiting surfaces of vehicles may include a hood, a roof, a truck, a tail gate, a truck bed, etc.

A body light housing 139 of an emergency roadside warning apparatus may comprise one or more magnetic couplers 702a, 702b. The one of more magnetic couplers 702a, 702b of the body light housing 139 may be positioned within a magnetic field of a magnetic assembly of connected to a light platform.

Figure 8:
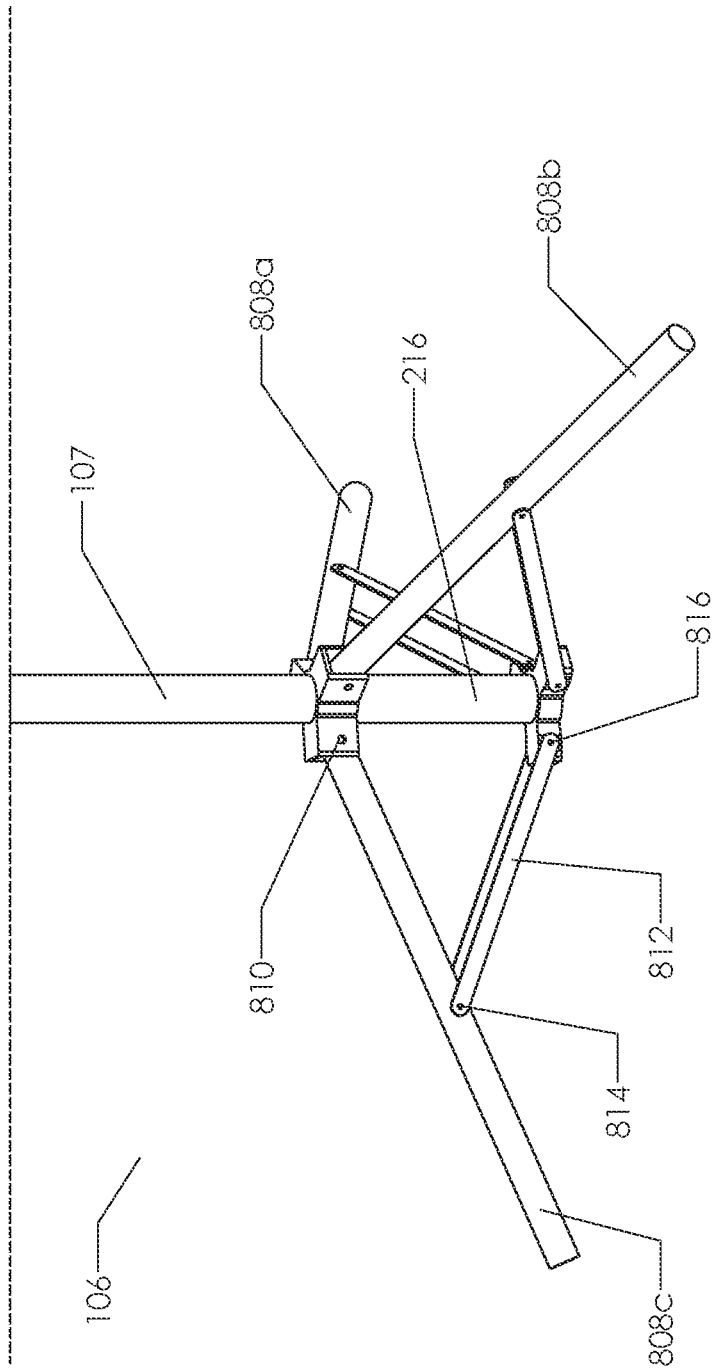
FIG. 8 is an illustration of an exemplary lower assembly of an emergency roadside warning apparatus, in accordance with the various embodiments.

FIG. 8 is an illustration of an exemplary lower assembly 106 of an emergency roadside warning apparatus, in accordance with the various embodiments.

In various embodiments, a lower assembly 106 may comprise one or more legs 808a, 808b, 808c operatively connected to a lower frame 107. In various embodiments, the legs 808a, 808b, 808c and the lower frame 107 may be a single component. In alternative, embodiments, the legs 808a, 808b, 808c may include multiple components. For example, one or more of the legs 808a, 808b, 808c may be operatively connected to the lower frame 107 using one or more collapsible systems. In various embodiments, the collapsible systems may be designed to enable relative movement between the lower frame 807 and one or more of the legs 808a, 808b, 808c.

In various embodiments, one or more legs 808a, 808b, 808c may be telescoping. An exemplary telescoping system may include an inner casing capable of sliding relative to an outer casing. In various embodiments, a positive of the inner casing and a position of the outer casing may be maintained. In some embodiments, a relative movement of the inner casing and the outer casing maintained using one or more clamps applying a fractional force. In additional and alternative embodiments, the tolerance between a surface of the inner casing abutting a surface of the outer casing may generate a frictional force such that the inner and outer casings may maintain position relative to one another.

Non-limiting examples of a lower assembly 106 can include at least one of a variety of commercially available stands. Similar lower assemblies exist in a variety of fields (e.g., music, camera, construction) designed to support a similarly weighted load. An exemplary load may comprise an upper assembly 102. Alternatively, or additionally, the load may comprise a body assembly 104. In various embodiments, the load may comprise both a body assembly 104 and an upper assembly 102. In other embodiments, the load may comprise a body assembly 104 or an upper assembly 102.

A lower assembly 106 may be collapsible, in accordance with various embodiments. An exemplary collapsible system may include one or more legs 808a, 808b, 808c affixed to a second end 216 of a lower frame 107 by one or more leg joints 810. In various embodiments, a leg joint 810 may be or include a hinge. The exemplary collapsible system may include one or more folding bars 812 affixed to each leg 808 at a position away from the second end 216 of the leg 808 by a first folding bar joint 814. The exemplary collapsible system may include one or more folding bars 812 affixed at or near the second end 216 of the lower frame 107 of the lower assembly 106 by a second folding bar joint 816.

Figure 13:
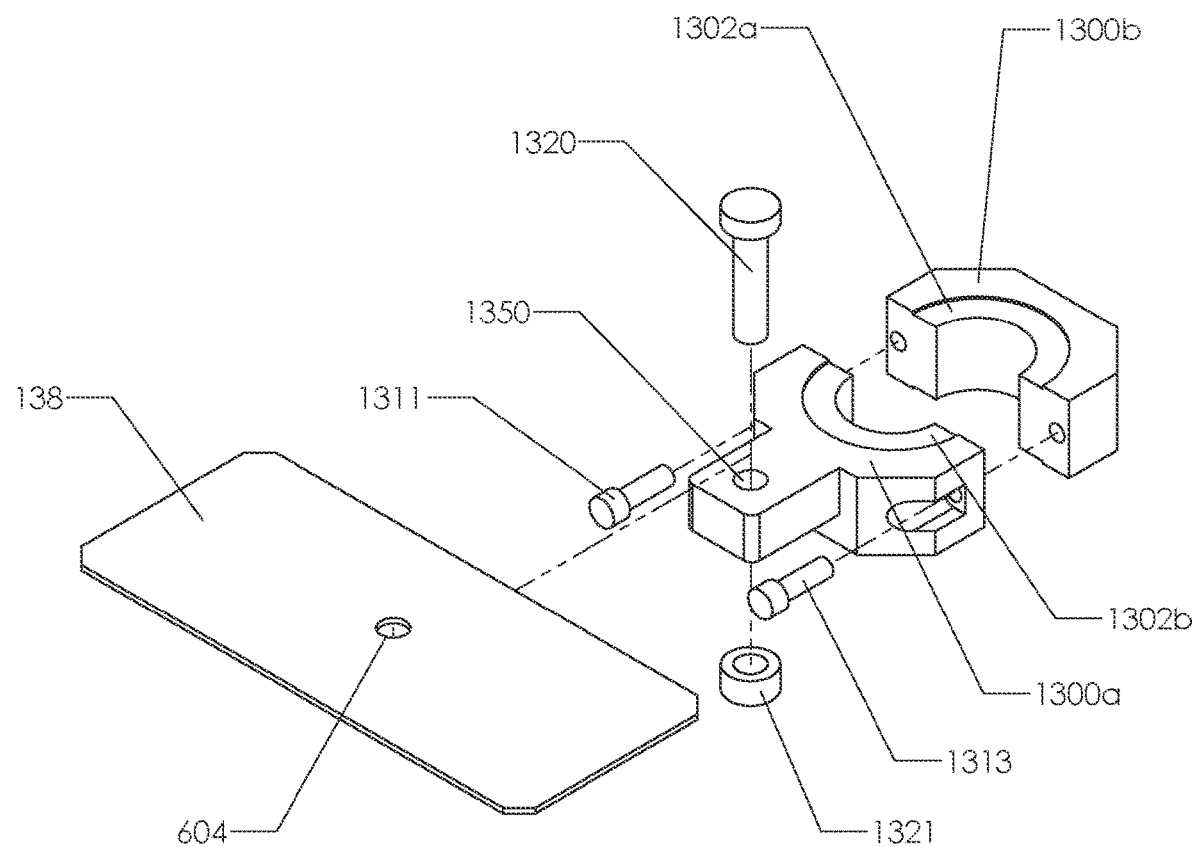
FIG. 13 shows an exploded view of an attachment assembly, in accordance with various embodiments.

FIG. 13 shows an exploded view of an attachment assembly 1300, in accordance with various embodiments. In various embodiments, a platform connector 604 of a light platform 138 may interact with an opening 1350 of an attachment assembly 1300 to attach a light platform 138 to a first portion or a second portion of a body assembly. In various embodiments, a platform connector 604 may be an opening and a screw 1320 and nut 1321 can interact (e.g. the screw can pass through the openings 1350, 604) with the opening 1350 of the first portion 1300a of the attachment assembly and the platform connector 604 of the light platform 138 to secure the light platform 138 to the attachment assembly 1300.

In various embodiments, the attachment assembly may be a clamp that comprises a first portion 1300a and a second portion 1300b. In various embodiments, one or more screws 1311, 1313 may be inserted through one or more openings on the first portion 1300a and the second portion 1300b and secured by one or more nuts 1312, 1314 to draw the two portions 1300a, 1300b together to compress against a portion of the body assembly. In some embodiments, a compressible material 1302a, 1302b may line an interior portion of the first portion 1300a and the second portion 1300b to increase a frictional force against the portion of the body assembly, thereby restricting movement of the attachment assembly 1300.

In various embodiments, the screw 1320 and nut 1321 can, instead, be a fastener of any kind. The fastener may include a weld, bolt, clip, or any other fastener known.

In various embodiments, one of more of the folding bar joints 812, 814 may be or comprise a hinge. Commercially available joints and hinges may be suitable. In some embodiments a pin may comprise a body including a first end and a second end. The body of the pin may extend through an opening in a folding bar and through an opening of a leg. The first and second ends of the pins may be secured with a cap.

II. Emergency Roadside Warning Systems

Figure 9:
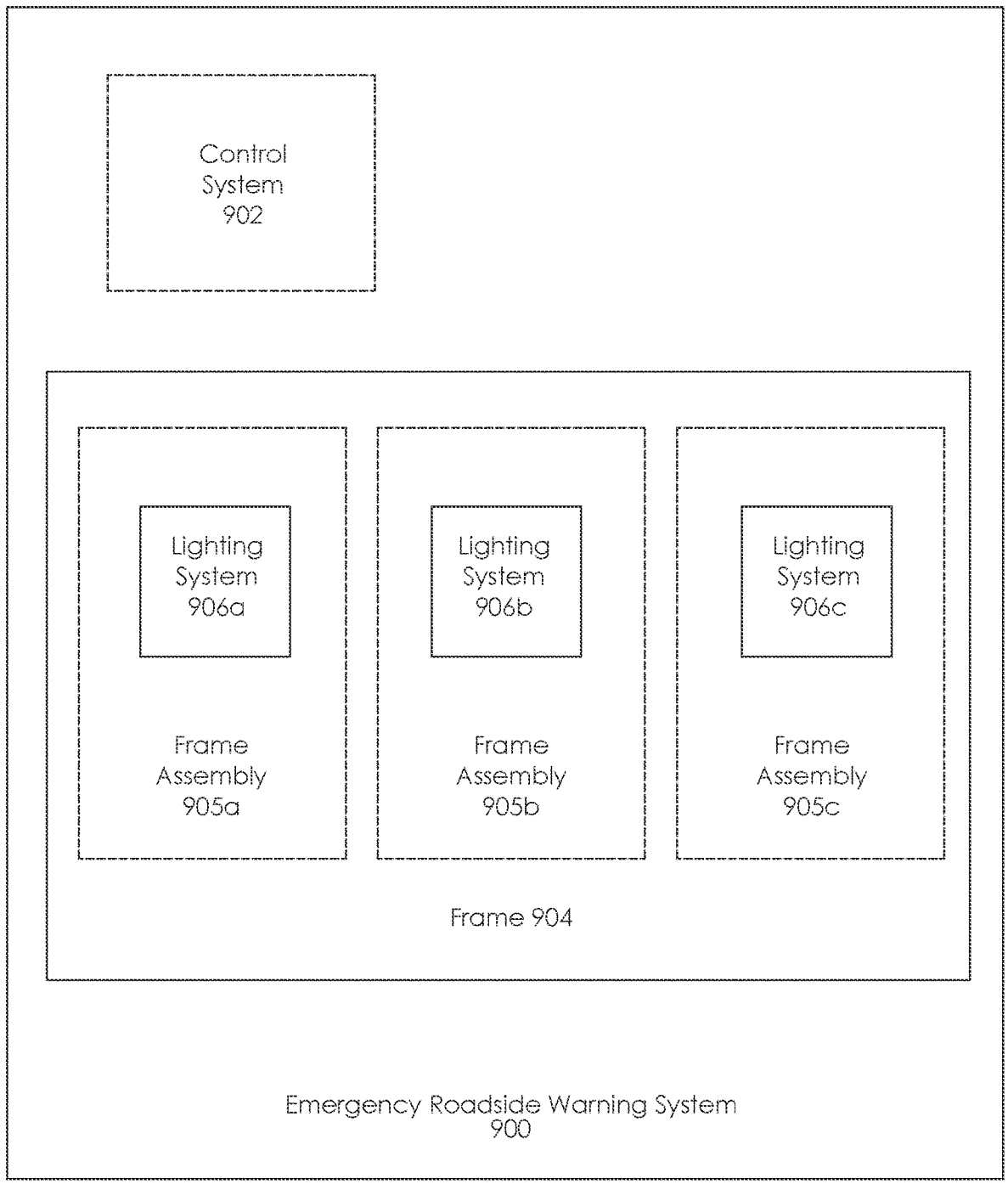
FIG. 9 is a block diagram of an exemplary emergency roadside warning system, in accordance with various embodiments.

FIG. 9 is a block diagram of an exemplary emergency roadside warning system 900, in accordance with various embodiments. In various embodiments, the emergency roadside warning system 900 may comprise a frame 904 for providing structure support to one or more components of the emergency roadside warning system 900.

A frame 904 can serve to provide structure support for one or more lighting systems 906a, 906b, 906c, in accordance with various embodiments. In various embodiments, the frame 904 may be comprised of one or more frame assemblies 905a, 905b, 905c. In various embodiments, at least one of the frame assemblies 905a, 905b, 905c comprises an upper assembly as described herein. In various embodiments, at least one of the frame assemblies 905a, 905b, 905c comprises a body assembly as described herein. In various embodiments, at least one of the frame assemblies 905a, 905b, 905c comprises a lower assembly as described herein.

In various embodiments, an emergency roadside warning system 900 may comprise one or more control devices 902. In various embodiments, the one or more control systems 902 may be in electronic communication with the one or more lighting systems 906a, 906b, 906c.

In various embodiments, the one or more control systems 902 may send an electronic signal to the one or more lighting systems 906a, 906b, 906c. In various embodiments, the signal may include instructions for activating or deactivating the one or more lighting systems 906a, 906b, 906c. In various embodiments, the one or more lighting systems 906a, 906b, 906c may include one or more modes of operation. In various embodiments, modes of operation may include operating one or more lights of the one or more lighting systems 906a, 906n, 906c in a pattern (e.g., changing colors, blinking patterns, brightness, or other modifications to light emission).

Figure 10:
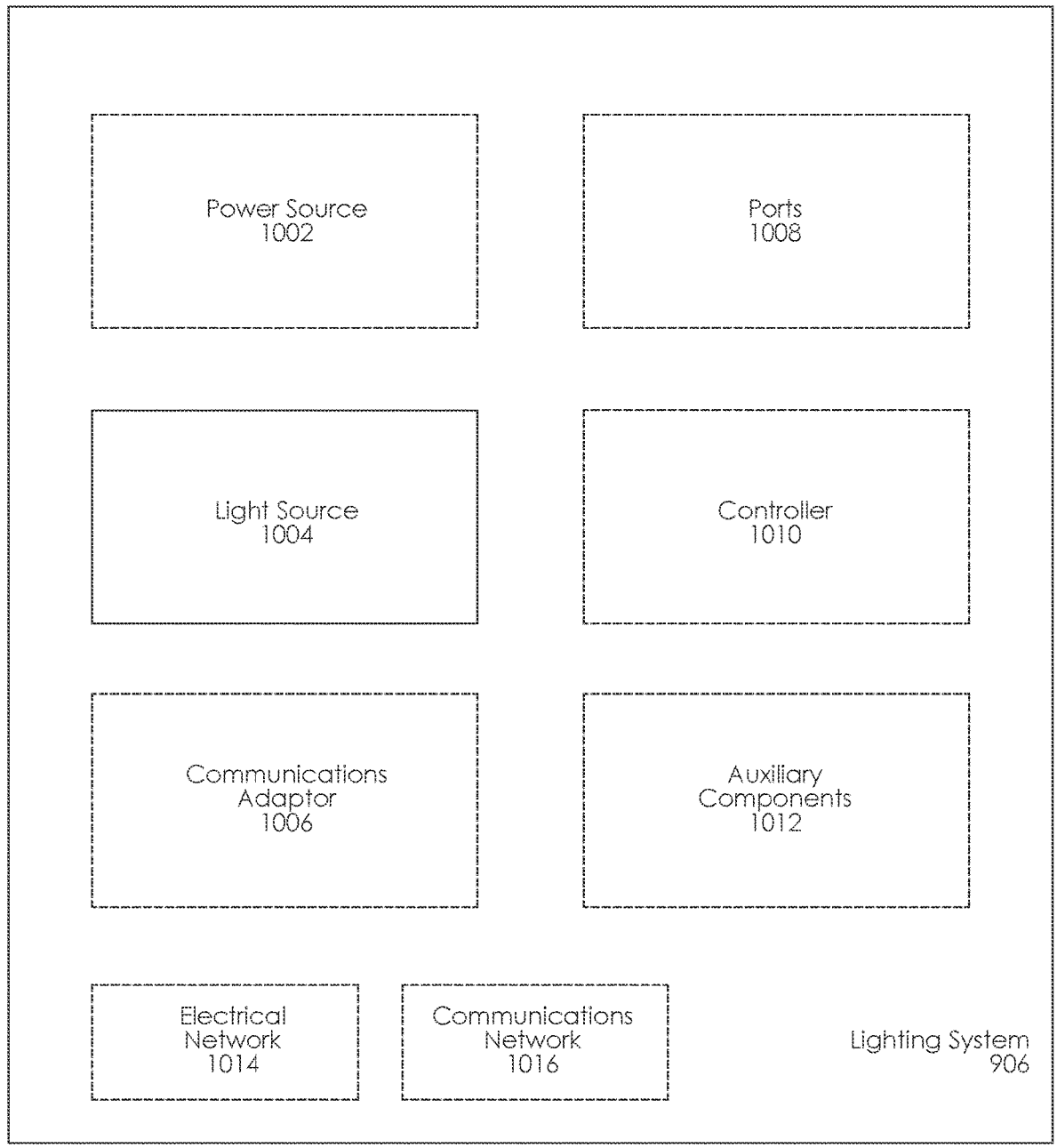
FIG. 10 is a block diagram of an exemplary light system for an emergency roadside warning system, in accordance with various embodiments.

FIG. 10 is a block diagram of an exemplary lighting system 906 for an emergency roadside warning system, in accordance with various embodiments. In some embodiments, a basic lighting system 906 may include a light source 1004.

Light source 1004 may include a single light source, in accordance with various embodiments. Light source 1004 may include a plurality of light sources, in accordance with various embodiments. Non-limiting examples of a light source 1004 include an incandescent light source, a light emitting diode, an element comprising an anode and a cathode, a neon light source, a fluorescent light source, a halogen light source, a metal halide light source, a high intensity discharge light source, and a low-pressure sodium light source.

In various embodiments, a lighting system 906 may comprise a power source 1002. In various embodiments, the power source 1002 may power the light source 1004. In various embodiments, electricity may be transferred to the light source 1004 from the power source 1002. In various embodiments, electricity may be transferred over an electrical network 1014. The electrical network 1014 may include wires (e.g., a conductive material wrapped in a non-conductive material such as standard copper wiring), in accordance with various embodiments. In many embodiments, the non-conductive material may comprise a non-conductive polymer (e.g., Polyvinyl Chloride, Nylon Type 6, or Nylon Type 11). In some cases, the standards (e.g., material grade, gauge, quality, purity, or any physical property metric) for materials used may be determined by a regulatory authority. In other embodiments, electrical network 1014 may comprise a fluid such as air (e.g., wireless power transfer using electromagnetic induction). A non-limiting example of a power source 1004 may include an electricity storing battery (e.g., a lithium-ion battery). However, a skilled artisan will appreciate that a variety of different power sources 1004 may be appropriate for different conditions and situations. In various embodiments, the electrical network 1014 may electrically couple the power source 1002 to one or more of the components 1002, 1004, 1006, 1008, 1010, 1012, 1016 of the lighting system 906 in any combination.

In various embodiments, the lighting system 906 may comprise one or more ports 1008. In various embodiments, at least one of the one or more ports 1008 may provide the power source 1002 with access to electricity (e.g., an external power source can be electrically coupled with the power source for charging). In various embodiments, at least one of the one or more ports may provide access to information (e.g., a power level of the power source 1002).

In various embodiments, the lighting system 906 may comprise a controller 1010. In various embodiments, the controller 1010 may comprise an on/off switch for connecting/disconnecting the power source 1002 one or more of the components (e.g., a light source 1004) of a lighting system 906. In various embodiments, the controller 1010 may comprise pre-programmed instructions for operation of the one or more light sources 1004. In various embodiments, the controller 1010 may cause the one or more light sources 1004 to blink. In various embodiments, the controller 1010 may cause the one or more light sources 1004 to change color. In various embodiments, the controller 1010 may cause the one or more light sources 1010 to blink and/or change color and/or brightness in a pattern. In various embodiments, the lighting system 906 may comprise a communications network 1006.

In various embodiments, the communications network 1006 may enable electronic communication between the controller 1010 and one or more of the ports 1008. In various embodiments, the communications network 1006 may enable electronic communication between the controller 1010 and the power source 1002. In various embodiments, the communications network 1006 may enable electronic communication between the controller 1010 and the light source 1004. In various embodiments, the communications network 1006 may enable electronic communication between the controller 1010 and the communications adapter 1006. In various embodiments, the communications network 1006 may enable electronic communication between the controller 1010 and the auxiliary components 1012. In various embodiments, the communications network 1016 can connect two or more of the components 1002, 1004, 1006, 1008, 1010, 1012 of the lighting system 906 in any combination. In various embodiments, the communications network 1006 may comprise wiring and/or wireless communications hardware (e.g., Bluetooth and/or WIFI adapters).

Figure 11:
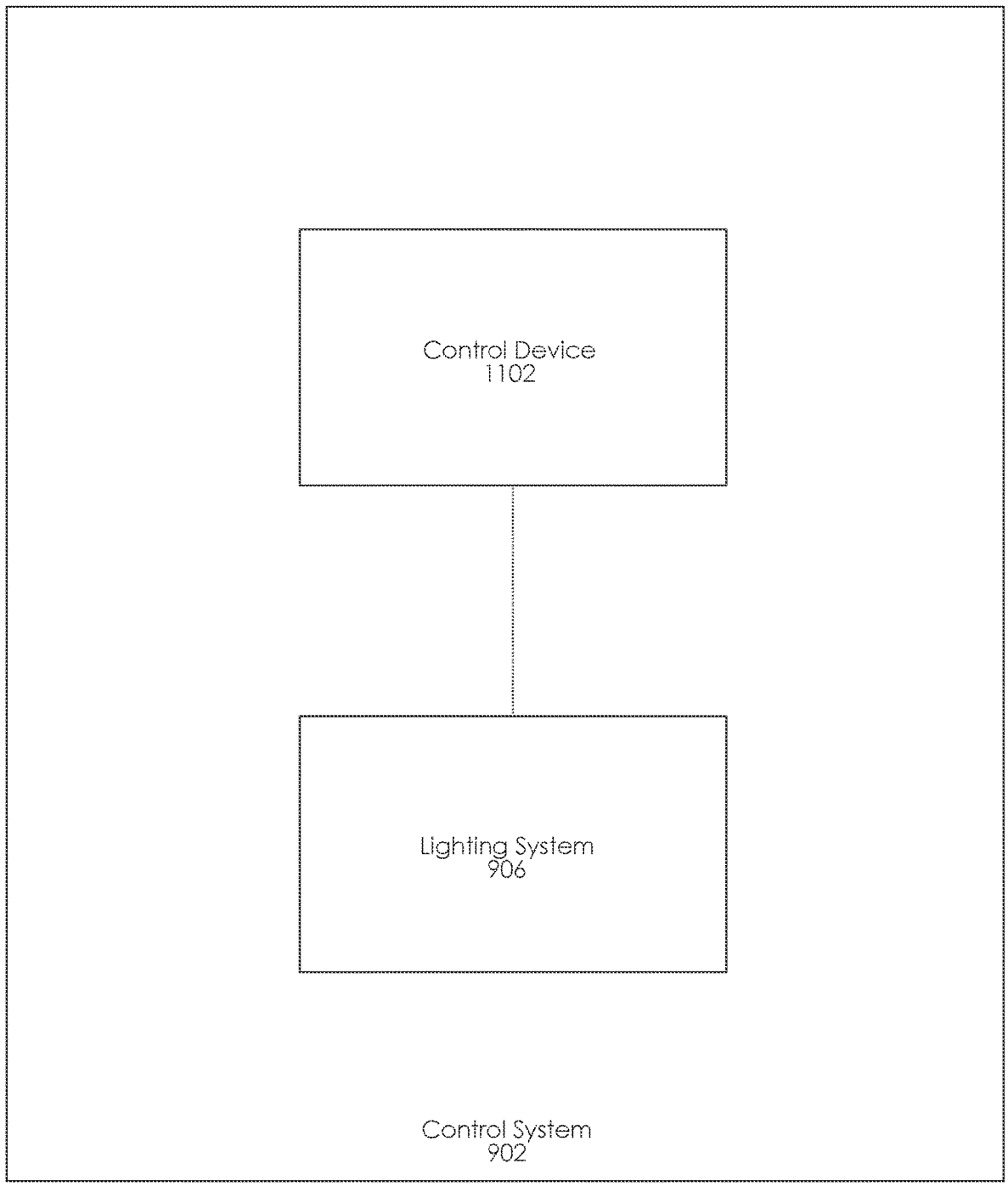
FIG. 11 is a block diagram of an exemplary control system for an emergency roadside warning system, in accordance with various embodiments.

FIG. 11 is a block diagram of an exemplary control system 1202 for an emergency roadside warning system, in accordance with various embodiments. In various embodiments, the control system 1202 may comprise a lighting system 906 or one or more components thereof. In various embodiments, the control system 1202 may comprise a control device 1102.

Figure 12:
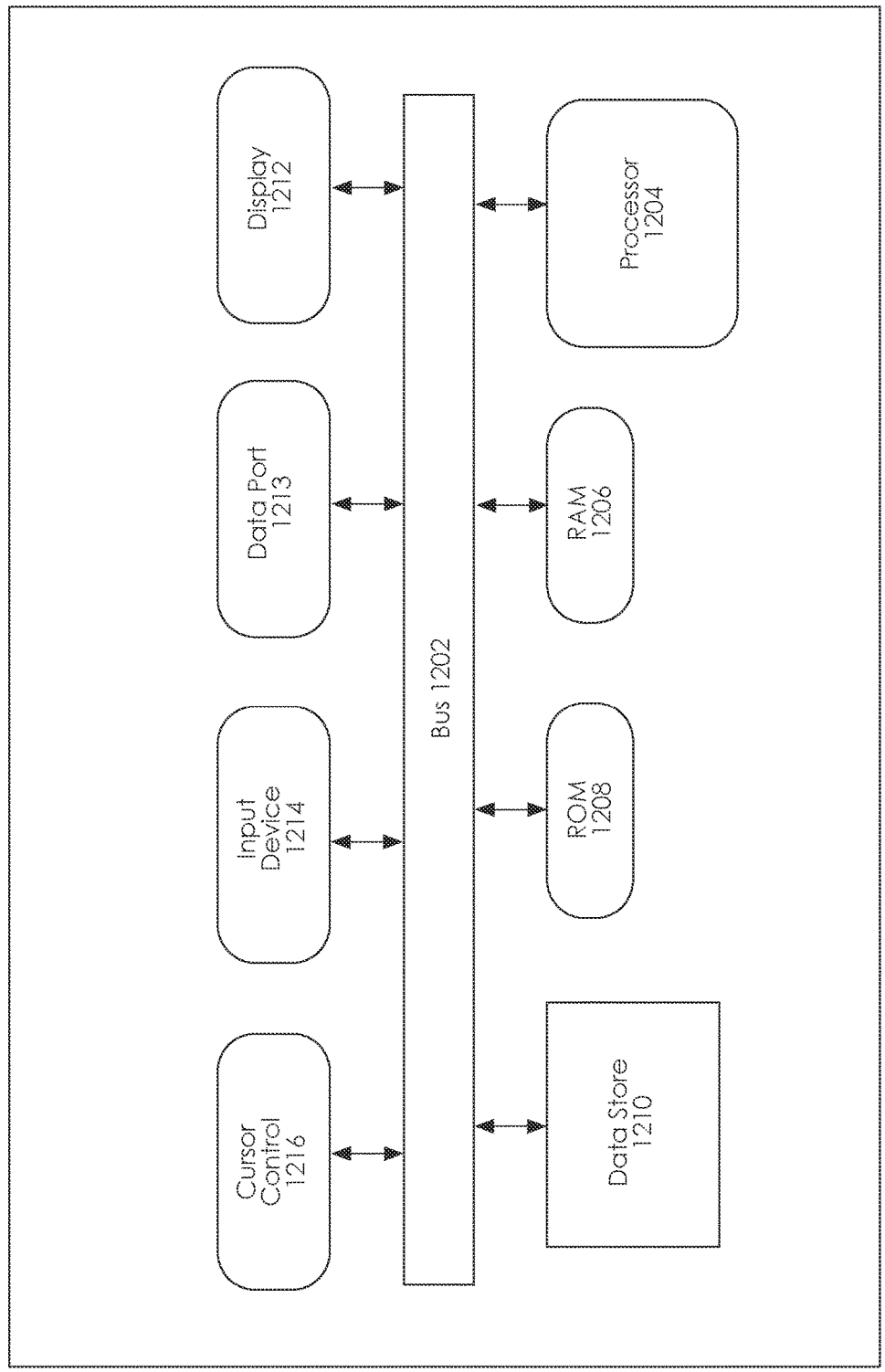
FIG. 12 shows a schematic diagram of a computer system, in accordance with various embodiments.

In various embodiments, a control device 1102 may comprise a computer system (e.g., a computer system 1200—See FIG. 12). A computer system 1200 can be incorporated into a desktop system or portable system.

One non-limiting example of a control device 1102 may be a smart phone operating an application for controlling the lighting system 906. In various embodiments, an application of a smart phone may electronically communicate instructions to the controller 1010 of the lighting system 906. In various embodiments, a data port of the control device 1102 may communicate instructions for carrying out one or more of the processes or methods described herein to a communications adaptor 1006 of the lighting system 906. In various embodiments, the communications adaptor 1006 may relay the instructions over a communications network 1016 to a controller 1010. In various embodiments, the control communicates the instructions to one or more of the components of the lighting system 906.

FIG. 12 shows a schematic diagram of a computer system 1200, in accordance with various embodiments. The computer system 1200, upon which embodiments of the present teachings may be implemented. In various embodiments of the present teachings, computer system 1200 can include a bus 1202 or other communication mechanism for communicating information, and a processor 1204 coupled with bus 1202 for processing information. In various embodiments, computer system 1200 can also include a memory, which can be a random-access memory (RAM) 1206 or other dynamic storage device, coupled to bus 1202 for determining instructions to be executed by processor 1204. Memory also can be used for storing temporary variables or other intermediate information during execution of instructions to be executed by processor 1204. In various embodiments, computer system 1200 can further include a read only memory (ROM) 1208 or other static storage device coupled to bus 1202 for storing static information and instructions for processor 1204. A storage device 1210, such as a magnetic disk or optical disk, can be provided and coupled to bus 1202 for storing information and instructions.

In some embodiments, computer system 1200 can be coupled via bus 1202 to a display 1212, such as a cathode ray tube (CRT), liquid crystal display (LCD), or light emitting diode display (LED) for displaying information to a computer user. An input device 1214, including alphanumeric and other keys, can be coupled to bus 1202 for communicating information and command selections to processor 1204. Another type of user input device is a cursor control 1216, such as a mouse, a trackball or cursor direction keys for communicating direction information and command selections to processor 1204 and for controlling cursor movement on display 1212. The input device 1214 typically has two degrees of freedom in two axes, a first axis (i.e., x) and a second axis (i.e., y), that allows the device to specify positions in a plane. However, it should be understood that input devices 1214 allowing for 3-dimensional (x, y and z) cursor movement are also contemplated herein.

In various embodiments, computer system 1200 can be coupled via bus 1202 to one or more data ports 1213. In various embodiments, the one or more data ports 1213 may enable electronic communication between the components via bus 1202 of the computer system 1200 and the components 1002, 1004, 1006, 1008, 1010, 1012, 1014, 1016 of the lighting system 906.

Consistent with certain implementations of the present teachings, results can be provided by computer system 1200 in response to processor 1204 executing one or more sequences of one or more instructions contained in memory 1206. Such instructions can be read into memory 1206 from another computer-readable medium or computer-readable storage medium, such as storage device 1210. Execution of the sequences of instructions contained in memory 1206 can cause processor 1204 to perform the processes described herein. Alternatively, hard-wired circuitry can be used in place of or in combination with software instructions to implement the present teachings. Thus, implementations of the present teachings are not limited to any specific combination of hardware circuitry and software.

According to various embodiments, computer-readable medium (e.g., data store, data storage, etc.) or computer-readable storage medium may comprise any media that participates in providing instructions to processor 504 for execution. Such a medium can take many forms, including but not limited to, non-volatile media, volatile media, and transmission media. Non-limiting examples of non-volatile media can include optical, solid state, magnetic disks, such as storage device 510. Examples of volatile media can include, but are not limited to, dynamic memory, such as memory 506. Examples of transmission media can include, but are not limited to, coaxial cables, copper wire, and fiber optics, including the wires that comprise bus 502.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In addition to computer readable medium, instructions or data can be provided as signals on transmission media included in a communications apparatus or system to provide sequences of one or more instructions to processor 504 of computer system 500 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc.

Equivalence

Those skilled in the art will recognize or be able to ascertain using no more than routine experimentation, many equivalents to the specific embodiments of the invention described herein. It is to be understood that the invention encompasses all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. Further, it should also be understood that any embodiment or aspect of the invention can be explicitly excluded from the claims, regardless of whether the specific exclusion is recited in the specification. The scope of the present invention is not intended to be limited to the above Description, but rather is as set forth in the claims that follow.

What is claimed:

1. An emergency roadside warning apparatus comprising:
   an upper assembly comprising:
      an upper frame;
      at least one light mounted to the upper frame;
      a controller mounted to the upper frame, wherein the at least one light is in electronic communication with the controller;

an upper handle comprising a grip, wherein the upper handle is mounted to the upper frame;
a body assembly comprising:
  a body frame connected to the upper frame;
  a light platform mounted to the body frame;
  a body light housing magnetically coupled to the light platform; and
a lower assembly comprising:
  a lower frame connected to the body frame; and
  a plurality of legs coupled to the lower frame,
wherein the upper assembly further comprises:
  an upper handle mounted between a first end and a second end of the upper frame,
wherein the upper handle comprises a grip;
  a first upper light housing mounted by a light connector to the first end of the upper frame, wherein the first light housing comprises a light of the at least one light;
  a second upper light housing mounted by a light connector to the second end of the upper frame, wherein the second light housing comprises a light of the at least one light and wherein the first and second upper light housings are not in direct contact with the handle.

2. The emergency roadside warning apparatus of claim 1, wherein the body frame comprises:
  a first portion including a first end and a second end; and
  a second portion including a first end and a second end, wherein the first end of the first portion is detachably coupled to the second end of the second portion.

3. The emergency roadside warning apparatus of claim 2, wherein the first end of the first portion is detachably coupled to the second end of the second portion by a frictional force between a sidewall of the second portion and a sidewall of the first portion.

4. The emergency roadside warning apparatus of claim 3, wherein the frictional force is applied by a clamp.

5. The emergency roadside warning apparatus of claim 4, wherein the lower frame comprises a first end and a second end.

6. The emergency roadside warning apparatus of claim 5, wherein the second end of the first portion is detachably coupled to the first end of the lower frame by a frictional force between a sidewall of the first portion and a sidewall of the lower frame.

7. The emergency roadside warning apparatus of claim 6, wherein the frictional force is applied by a clamp.

8. The emergency roadside warning apparatus of claim 1, wherein the upper assembly further comprises:
  a first support mounted to the first end of the upper frame;
  a second support mounted to the second end of the upper frame; and
  a connector end mounted to the upper frame, wherein the connector end is positioned on a first surface of the upper frame and the upper handle is positioned on a second surface of the upper frame, wherein the first surface and the second surface oppose one another.

9. The emergency roadside warning apparatus of claim 8, wherein the connector end is coupled with an upper connector, wherein the upper connector is mounted to the first end of the second portion.

10. The emergency roadside warning apparatus of claim 9, wherein the upper assembly further comprises:
  a controller mounted to the upper frame, wherein the controller comprises a network adapter in electronic communication with a network;
  a junction mounted to the upper frame, wherein the junction comprises a network adapter in electronic communication with the network,
wherein the first and second upper light housings each comprise a network adapter and each of the network adapters are in electronic communication with the network.

11. The emergency roadside warning apparatus of claim 10, wherein one or more of the adapters are wireless adapters.

12. The emergency roadside warning apparatus of claim 10, wherein one or more of the adapters are wired adapters.

13. The emergency roadside warning apparatus of claim 10, wherein the network comprises cable.

14. The emergency roadside warning apparatus of claim 10, further comprising a control device in electronic communication with the controller.

15. The emergency roadside warning apparatus of claim 10, wherein the upper handle further comprises:
  a connector portion including a first end and a second end;
  a first 90-degree coupler including a first end and a second end, wherein the second end of the 90-degree coupler is joined to the first end of the connection portion;
  a second 90-degree coupler including a first end and a second end, wherein the first end of the second 90-degree coupler is joined to the second end of the connector portion;
  a first portion including a first end and a second end, wherein the second end of the first portion is joined to the first end of the first 90-degree coupler, wherein the grip encloses at least or portion of the first portion;
  a second portion including a first surface and a second surface, wherein the first surface of the second portion is joined to the second end of the second end of the 90-degree coupler and the second surface of the second portion abuts a frame surface of the upper frame.

16. The emergency roadside warning apparatus of claim 15, wherein the connector end extends away a bottom surface of the upper frame and the second portion of the upper handle is joined directly to the connector end.

17. The emergency roadside warning apparatus of claim 16,
wherein the upper frame further comprises a first flat region and an opposing second flat region,
wherein the upper connector of the first portion of the body frame of the body assembly comprises a first rail and a second rail.

18. The emergency roadside warning apparatus of claim 17, wherein the first flat region abuts the first rail and the second flat region abuts the second rail.

19. The emergency roadside warning apparatus of claim 18,
wherein the body light housing further comprises:
  one or more magnetic couplers;
  one or more pads connected to first end of the body light housing by a first pad connector;
wherein the light platform further comprises:
  a magnetic assembly comprising at least one magnet mounted to a surface of the light platform 138.

20. The emergency roadside warning apparatus of claim 19, wherein the one of more magnetic couplers of the body light housing are positioned within a magnetic field of the magnetic assembly.

\* \* \* \* \*